(12) United States Patent
Persson et al.

(10) Patent No.: US 10,214,913 B2
(45) Date of Patent: *Feb. 26, 2019

(54) POWDER BASED BALANCING LAYER

(71) Applicant: VALINGE INNOVATION AB, Viken (SE)

(72) Inventors: Hans Persson, Perstorp (SE); Niclas Hakansson, Viken (SE); Jan Jacobsson, Landskrona (SE)

(73) Assignee: VALINGE INNOVATION AB, Viken (SE)

( * ) Notice: Subject to any disclaimer, the term of this patent is extended or adjusted under 35 U.S.C. 154(b) by 464 days.

This patent is subject to a terminal disclaimer.

(21) Appl. No.: 14/738,274

(22) Filed: Jun. 12, 2015

(65) Prior Publication Data

US 2015/0275526 A1 Oct. 1, 2015

Related U.S. Application Data

(63) Continuation of application No. 13/444,653, filed on Apr. 11, 2012, now Pat. No. 9,085,905.

(60) Provisional application No. 61/557,734, filed on Nov. 9, 2011, provisional application No. 61/474,498, filed on Apr. 12, 2011.

(30) Foreign Application Priority Data

Apr. 12, 2011 (SE) ........................ 1150320
Nov. 9, 2011 (SE) ........................ 1151058

(51) Int. Cl.
| | | |
|---|---|---|
| E04F 15/04 | (2006.01) | |
| E04F 13/10 | (2006.01) | |
| B32B 21/02 | (2006.01) | |
| B32B 21/14 | (2006.01) | |
| B32B 37/24 | (2006.01) | |
| B27N 3/04 | (2006.01) | |
| B27N 3/06 | (2006.01) | |
| B05D 1/00 | (2006.01) | |
| B27N 7/00 | (2006.01) | |
| B32B 21/04 | (2006.01) | |
| C08J 7/04 | (2006.01) | |
| C09D 5/03 | (2006.01) | |
| C09D 161/28 | (2006.01) | |
| E04F 13/08 | (2006.01) | |
| C09D 7/40 | (2018.01) | |
| B32B 38/00 | (2006.01) | |

(52) U.S. Cl.
CPC ............. *E04F 13/10* (2013.01); *B27N 3/06* (2013.01); *B27N 7/005* (2013.01); *B32B 21/02* (2013.01); *B32B 21/042* (2013.01); *B32B 21/14* (2013.01); *C08J 7/042* (2013.01); *C09D 5/033* (2013.01); *C09D 7/70* (2018.01); *C09D 161/28* (2013.01); *E04F 13/0866* (2013.01); *E04F 15/04* (2013.01); *E04F 15/045* (2013.01); *B05D 1/00* (2013.01); *B27N 3/04* (2013.01); *B32B 37/24* (2013.01); *B32B 38/145* (2013.01); *B32B 2255/08* (2013.01); *B32B 2255/24* (2013.01); *B32B 2262/067* (2013.01); *B32B 2305/07* (2013.01); *B32B 2305/20* (2013.01); *B32B 2305/30* (2013.01); *B32B 2305/70* (2013.01); *B32B 2310/0825* (2013.01); *B32B 2317/12* (2013.01); *B32B 2317/16* (2013.01); *B32B 2471/00* (2013.01); *B32B 2607/00* (2013.01); *C08J 2397/02* (2013.01); *C08J 2461/28* (2013.01); *C08J 2497/02* (2013.01); *Y10T 428/31982* (2015.04)

(58) Field of Classification Search
None
See application file for complete search history.

(56) References Cited

U.S. PATENT DOCUMENTS

| | | |
|---|---|---|
| 2,587,064 A | 2/1952 | Rapson |
| 2,831,793 A | 4/1958 | Elmendorf |
| 2,962,081 A | 11/1960 | Dobry et al. |
| 3,032,820 A | 5/1962 | Johnson |
| 3,135,643 A | 6/1964 | Michl |

(Continued)

FOREIGN PATENT DOCUMENTS

| | | |
|---|---|---|
| AU | 80284/75 | 6/1975 |
| CA | 2 557 096 A1 | 7/2005 |

(Continued)

OTHER PUBLICATIONS

Extended European Search Report issued in EP127718229, dated Oct. 14, 2014, European Patent Office, Munich, DE, 7 pages.

(Continued)

*Primary Examiner* — Sheeba Ahmed
(74) *Attorney, Agent, or Firm* — Buchanan Ingersoll & Rooney P.C.

(57) ABSTRACT

A method of manufacturing a building panel with a decorative surface layer, a core and a balancing and/or protective layer, wherein the method includes applying a first layer of a first powder based mix, including wood fibers and a thermosetting binder, on a core; applying a liquid substance on the first powder based mix; drying the first powder based mix; turning the core with the dried first powder based mix such that the first powder based mix points downwards; applying a second layer on the upper part of the core; and curing the first and second layers by providing heat and pressure, wherein the first layer forms the balancing and/or protective layer and the second layer forms the decorative surface layer in the building panel.

28 Claims, 3 Drawing Sheets

(56) References Cited

U.S. PATENT DOCUMENTS

| | | |
|---|---|---|
| 3,286,006 A | 11/1966 | Annand |
| 3,308,013 A | 3/1967 | Bryant |
| 3,325,302 A | 6/1967 | Hosfeld |
| 3,342,621 A | 9/1967 | Point et al. |
| 3,345,234 A | 10/1967 | Jecker et al. |
| 3,373,070 A | 3/1968 | Fuerst |
| 3,426,730 A | 2/1969 | Lawson et al. |
| 3,463,653 A | 8/1969 | Letter |
| 3,486,484 A | 12/1969 | Bullough |
| 3,533,725 A | 10/1970 | Bridgeford |
| 3,540,978 A | 11/1970 | Ames |
| 3,565,665 A | 2/1971 | Stranch et al. |
| 3,673,020 A | 6/1972 | De Jaeger |
| 3,846,219 A | 11/1974 | Kunz |
| 3,880,687 A | 4/1975 | Elmendorf et al. |
| 3,897,185 A | 7/1975 | Beyer |
| 3,897,588 A | 7/1975 | Nohtomi |
| 3,914,359 A | 10/1975 | Bevan |
| 3,961,108 A | 6/1976 | Rosner et al. |
| 4,052,739 A | 10/1977 | Wada et al. |
| 4,093,766 A | 6/1978 | Scher et al. |
| 4,131,705 A | 12/1978 | Kubinsky |
| 4,313,857 A | 2/1982 | Blount |
| 4,337,290 A | 6/1982 | Kelly et al. |
| 4,420,525 A | 12/1983 | Parks |
| 4,430,375 A | 2/1984 | Scher et al. |
| 4,474,920 A | 10/1984 | Kyminas et al. |
| 4,890,656 A | 1/1990 | Ohsumi et al. |
| 5,034,272 A | 7/1991 | Lindgren et al. |
| 5,040,582 A | 8/1991 | Hsu et al. |
| 5,206,066 A | 4/1993 | Horacek |
| 5,246,765 A | 9/1993 | Lussi et al. |
| 5,258,216 A | 11/1993 | Von Bonin et al. |
| 5,314,554 A | 5/1994 | Owens |
| 5,422,170 A | 6/1995 | Iwata et al. |
| 5,466,511 A | 11/1995 | O'Dell et al. |
| 5,543,193 A | 8/1996 | Tesch |
| 5,569,424 A | 10/1996 | Amour |
| 5,601,930 A | 2/1997 | Mehta et al. |
| 5,604,025 A | 2/1997 | Tesch |
| 5,609,966 A | 3/1997 | Perrin et al. |
| 5,766,522 A | 6/1998 | Daly et al. |
| 5,827,788 A | 10/1998 | Miyakoshi |
| 5,855,832 A | 1/1999 | Clausi |
| 5,891,564 A | 4/1999 | Schultz et al. |
| 5,925,296 A | 7/1999 | Leese |
| 5,942,072 A | 8/1999 | McKinnon |
| 6,036,137 A | 3/2000 | Myren |
| 6,103,377 A | 8/2000 | Clausi |
| 6,238,750 B1 | 5/2001 | Correll et al. |
| 6,468,645 B1 | 10/2002 | Clausi |
| 6,521,326 B1 | 2/2003 | Fischer et al. |
| 6,537,610 B1 | 3/2003 | Springer et al. |
| 6,620,349 B1 | 9/2003 | Lopez |
| 6,769,217 B2 | 8/2004 | Nelson |
| 6,773,799 B1 | 8/2004 | Persson et al. |
| 6,803,110 B2 | 10/2004 | Drees et al. |
| 6,926,954 B2 | 8/2005 | Shuren et al. |
| 6,991,830 B1 | 1/2006 | Hansson et al. |
| 7,022,756 B2 | 4/2006 | Singer |
| 7,485,693 B2 | 2/2009 | Matsuda et al. |
| 7,811,489 B2 | 10/2010 | Pervan |
| 8,349,234 B2 | 1/2013 | Ziegler et al. |
| 8,349,235 B2 | 1/2013 | Pervan et al. |
| 8,419,877 B2 | 4/2013 | Pervan et al. |
| 8,431,054 B2 | 4/2013 | Pervan et al. |
| 8,480,841 B2 | 7/2013 | Pervan et al. |
| 8,481,111 B2 | 7/2013 | Ziegler et al. |
| 8,617,439 B2 | 12/2013 | Pervan et al. |
| 8,663,785 B2 | 3/2014 | Ziegler et al. |
| 8,728,564 B2 | 5/2014 | Ziegler et al. |
| 8,784,587 B2 | 7/2014 | Lindgren et al. |
| 8,920,874 B2 | 12/2014 | Ziegler et al. |
| 8,920,876 B2 | 12/2014 | Vetter et al. |
| 8,993,049 B2 | 3/2015 | Pervan |
| 9,085,905 B2 * | 7/2015 | Persson ............ C09D 7/1291 |
| 9,181,698 B2 | 11/2015 | Pervan et al. |
| 9,255,405 B2 | 2/2016 | Pervan et al. |
| 9,296,191 B2 | 3/2016 | Pervan et al. |
| 9,352,499 B2 | 5/2016 | Ziegler et al. |
| 9,403,286 B2 | 8/2016 | Vetter et al. |
| 9,410,319 B2 | 8/2016 | Ziegler et al. |
| 9,556,622 B2 | 1/2017 | Pervan et al. |
| 9,783,996 B2 | 10/2017 | Pervan et al. |
| 2001/0006704 A1 | 7/2001 | Chen et al. |
| 2001/0009309 A1 | 7/2001 | Taguchi et al. |
| 2002/0054994 A1 | 5/2002 | Dupre et al. |
| 2002/0100231 A1 | 8/2002 | Miller |
| 2003/0056873 A1 | 3/2003 | Nakos et al. |
| 2003/0059639 A1 | 3/2003 | Worsley |
| 2003/0102094 A1 | 6/2003 | Tirri et al. |
| 2003/0208980 A1 | 11/2003 | Miller et al. |
| 2004/0123542 A1 | 7/2004 | Grafenauer |
| 2004/0191547 A1 | 9/2004 | Oldorff |
| 2004/0202857 A1 | 10/2004 | Singer |
| 2004/0206036 A1 | 10/2004 | Pervan |
| 2004/0237436 A1 | 12/2004 | Zuber et al. |
| 2004/0250911 A1 | 12/2004 | Vogel |
| 2005/0003099 A1 | 1/2005 | Quist |
| 2005/0079780 A1 | 4/2005 | Rowe et al. |
| 2005/0193677 A1 | 9/2005 | Vogel |
| 2005/0252130 A1 | 11/2005 | Martensson |
| 2006/0008630 A1 | 1/2006 | Thiers et al. |
| 2006/0024465 A1 | 2/2006 | Briere |
| 2006/0032175 A1 | 2/2006 | Chen et al. |
| 2006/0070321 A1 | 4/2006 | Au |
| 2006/0145384 A1 | 7/2006 | Singer |
| 2006/0182938 A1 | 8/2006 | Oldorff |
| 2006/0183853 A1 | 8/2006 | Sczepan |
| 2007/0055012 A1 | 3/2007 | Caldwell |
| 2007/0066176 A1 | 3/2007 | Wenstrup et al. |
| 2007/0166516 A1 | 7/2007 | Kim et al. |
| 2007/0184244 A1 | 8/2007 | Doehring |
| 2007/0207296 A1 | 9/2007 | Eisermann |
| 2007/0218260 A1 | 9/2007 | Miclo et al. |
| 2007/0224438 A1 | 9/2007 | Van Benthem et al. |
| 2007/0256804 A1 | 11/2007 | Garcis Espino et al. |
| 2008/0000417 A1 | 1/2008 | Pervan et al. |
| 2008/0032120 A1 | 2/2008 | Braun |
| 2008/0090032 A1 | 4/2008 | Perrin et al. |
| 2008/0176039 A1 | 7/2008 | Chen et al. |
| 2008/0263985 A1 | 10/2008 | Hasch et al. |
| 2009/0056257 A1 | 3/2009 | Mollinger et al. |
| 2009/0124704 A1 | 5/2009 | Jenkins |
| 2009/0135356 A1 | 5/2009 | Ando |
| 2009/0145066 A1 | 6/2009 | Pervan |
| 2009/0155612 A1 * | 6/2009 | Pervan ............ B32B 21/02 428/498 |
| 2009/0208646 A1 | 8/2009 | Kreuder et al. |
| 2009/0294037 A1 | 12/2009 | Oldorff |
| 2009/0311433 A1 | 12/2009 | Wittmann |
| 2010/0092731 A1 | 4/2010 | Pervan et al. |
| 2010/0196678 A1 | 8/2010 | Vermeulen |
| 2010/0223881 A1 | 9/2010 | Kalwa |
| 2010/0239820 A1 | 9/2010 | Buhlmann |
| 2010/0291397 A1 | 11/2010 | Pervan et al. |
| 2010/0300030 A1 | 12/2010 | Pervan et al. |
| 2010/0307675 A1 | 12/2010 | Buhlmann |
| 2010/0307677 A1 | 12/2010 | Buhlmann |
| 2010/0319282 A1 | 12/2010 | Ruland |
| 2010/0323187 A1 | 12/2010 | Kalwa |
| 2010/0330376 A1 | 12/2010 | Trksak |
| 2011/0175251 A1 | 7/2011 | Ziegler et al. |
| 2011/0177319 A1 | 7/2011 | Ziegler et al. |
| 2011/0177354 A1 | 7/2011 | Ziegler et al. |
| 2011/0189448 A1 | 8/2011 | Lindgren et al. |
| 2011/0247748 A1 | 10/2011 | Pervan et al. |
| 2011/0250404 A1 | 10/2011 | Pervan et al. |
| 2011/0262720 A1 | 10/2011 | Riebel et al. |
| 2011/0283642 A1 | 11/2011 | Meirlaen et al. |
| 2011/0283650 A1 | 11/2011 | Pervan et al. |
| 2011/0293823 A1 | 12/2011 | Bruderer et al. |
| 2011/0293906 A1 | 12/2011 | Jacobsson |
| 2012/0263878 A1 | 10/2012 | Ziegler et al. |

(56) References Cited

U.S. PATENT DOCUMENTS

| | | | |
|---|---|---|---|
| 2012/0263965 A1 | 10/2012 | Persson et al. |
| 2012/0264853 A1 | 10/2012 | Ziegler et al. |
| 2012/0288689 A1 | 11/2012 | Hansson et al. |
| 2012/0308774 A1 | 12/2012 | Persson et al. |
| 2013/0040118 A1 | 2/2013 | Buhlmann |
| 2013/0092314 A1 | 4/2013 | Ziegler et al. |
| 2013/0095315 A1 | 4/2013 | Pervan et al. |
| 2013/0111845 A1 | 5/2013 | Pervan et al. |
| 2013/0189534 A1 | 7/2013 | Pervan et al. |
| 2013/0269863 A1 | 10/2013 | Pervan et al. |
| 2013/0273244 A1 | 10/2013 | Vetter et al. |
| 2013/0273245 A1 | 10/2013 | Ziegler et al. |
| 2014/0044872 A1 | 2/2014 | Pervan |
| 2014/0075874 A1 | 3/2014 | Pervan et al. |
| 2014/0171554 A1 | 6/2014 | Ziegler et al. |
| 2014/0178630 A1 | 6/2014 | Pervan et al. |
| 2014/0186610 A1 | 7/2014 | Pervan |
| 2014/0199558 A1 | 7/2014 | Pervan et al. |
| 2014/0234531 A1 | 8/2014 | Ziegler et al. |
| 2015/0017461 A1 | 1/2015 | Lindgren et al. |
| 2015/0079280 A1 | 3/2015 | Vetter et al. |
| 2015/0093502 A1 | 4/2015 | Ziegler et al. |
| 2015/0111055 A1 | 4/2015 | Persson et al. |
| 2015/0159382 A1 | 6/2015 | Pervan |
| 2015/0197942 A1 | 7/2015 | Pervan et al. |
| 2015/0197943 A1 | 7/2015 | Ziegler et al. |
| 2015/0298433 A1 | 10/2015 | Kalwa |
| 2016/0031189 A1 | 2/2016 | Pervan et al. |
| 2016/0114495 A1 | 4/2016 | Pervan et al. |
| 2016/0186318 A1 | 6/2016 | Pervan et al. |
| 2016/0368180 A1 | 12/2016 | Ziegler et al. |
| 2016/0369507 A1 | 12/2016 | Pervan |
| 2017/0190156 A1 | 7/2017 | Ziegler et al. |

FOREIGN PATENT DOCUMENTS

| | | |
|---|---|---|
| CH | 298894 A | 5/1954 |
| DE | 1 815 312 A1 | 7/1969 |
| DE | 7148789 U | 4/1972 |
| DE | 29 39 828 A1 | 4/1981 |
| DE | 33 34 921 A1 | 4/1985 |
| DE | 42 36 266 A1 | 5/1993 |
| DE | 10 20060 24 593 A1 | 12/2000 |
| DE | 202 14 532 U1 | 2/2004 |
| DE | 103 31 657 A1 | 2/2005 |
| DE | 20 2004 003 061 U1 | 7/2005 |
| DE | 10 2004 050 278 A1 | 4/2006 |
| DE | 20 2006 007 797 U1 | 8/2006 |
| DE | 10 2005 046 264 A1 | 4/2007 |
| DE | 10 2010 045 266 A | 3/2012 |
| EP | 0 129 430 A2 | 12/1984 |
| EP | 0 129 430 B1 | 1/1990 |
| EP | 0 355 829 A2 | 2/1990 |
| EP | 0 611 408 A1 | 12/1993 |
| EP | 0 592 013 A2 | 4/1994 |
| EP | 0 656 443 A1 | 6/1995 |
| EP | 0 611 408 B1 | 9/1996 |
| EP | 0 732 449 A1 | 9/1996 |
| EP | 0 744 477 A2 | 11/1996 |
| EP | 0 914 914 A2 | 5/1999 |
| EP | 0 732 449 B1 | 8/1999 |
| EP | 0 7444 477 B1 | 1/2000 |
| EP | 1 035 255 A1 | 9/2000 |
| EP | 1 125 971 A1 | 8/2001 |
| EP | 1 136 251 A2 | 9/2001 |
| EP | 1 193 288 A1 | 4/2002 |
| EP | 1 209 199 A1 | 5/2002 |
| EP | 1 249 322 A1 | 10/2002 |
| EP | 1 454 763 A2 | 9/2004 |
| EP | 1 242 702 B1 | 11/2004 |
| EP | 1 498 241 A2 | 1/2005 |
| EP | 1 507 664 A1 | 2/2005 |
| EP | 1 507 664 B1 | 2/2005 |
| EP | 1 584 378 A1 | 10/2005 |
| EP | 1 681 103 A2 | 7/2006 |
| EP | 1 690 603 A1 | 8/2006 |
| EP | 1 847 385 A1 | 10/2007 |
| EP | 1 961 556 A1 | 8/2008 |
| EP | 1 985 464 A1 | 10/2008 |
| EP | 1 997 623 A1 | 12/2008 |
| EP | 2 025 484 A1 | 2/2009 |
| EP | 1 454 763 B1 | 8/2009 |
| EP | 2 105 320 A1 | 9/2009 |
| EP | 2 213 476 A1 | 8/2010 |
| EP | 2 226 201 A1 | 9/2010 |
| EP | 2 246 500 A2 | 11/2010 |
| EP | 2 264 259 A2 | 12/2010 |
| EP | 2 272 667 A1 | 1/2011 |
| EP | 2 272 668 A1 | 1/2011 |
| EP | 2 305 462 A1 | 4/2011 |
| EP | 1 847 385 B1 | 9/2011 |
| FR | 2 873 953 A1 | 2/2006 |
| GB | 984 170 A | 2/1965 |
| GB | 1090450 | 11/1967 |
| GB | 2 248 246 A | 4/1992 |
| JP | 2-229002 A | 9/1990 |
| JP | 11-291203 A | 9/1990 |
| JP | 4162799 B2 | 10/2000 |
| JP | 2001-287208 A | 10/2001 |
| JP | 2003-311717 A | 11/2003 |
| JP | 2003-311718 A | 11/2003 |
| JP | 2005-034815 A | 2/2005 |
| JP | 2005-074682 A | 3/2005 |
| JP | 2005-170016 A | 6/2005 |
| JP | 2005-219215 A | 8/2005 |
| JP | 3705482 B2 | 10/2005 |
| JP | 2005-307582 A | 11/2005 |
| JP | 2007-216692 A | 8/2007 |
| JP | 2007-268843 A | 10/2007 |
| JP | 2008-188826 A | 8/2008 |
| KR | 2002-0019815 A | 3/2002 |
| NZ | 225556 A1 | 2/1992 |
| SE | 469 326 B | 6/1993 |
| WO | WO 92/06832 A1 | 4/1992 |
| WO | WO 93/24295 A1 | 12/1993 |
| WO | WO 93/24296 A1 | 12/1993 |
| WO | WO 94/00280 A1 | 1/1994 |
| WO | WO 95/06568 A1 | 3/1995 |
| WO | WO 00/22225 A1 | 4/2000 |
| WO | WO 00/44576 A1 | 8/2000 |
| WO | WO 01/00409 A1 | 1/2001 |
| WO | WO 01/48333 A1 | 7/2001 |
| WO | WO 01/64408 A1 | 9/2001 |
| WO | WO 01/68367 A1 | 9/2001 |
| WO | WO 01/92037 A2 | 12/2001 |
| WO | WO 02/42167 A2 | 5/2002 |
| WO | WO 02/42373 A1 | 5/2002 |
| WO | WO 03/078761 A1 | 9/2003 |
| WO | WO 03/095202 A1 | 11/2003 |
| WO | WO 2004/042168 A1 | 5/2004 |
| WO | WO 2004/050359 A1 | 6/2004 |
| WO | WO 2004/054600 A1 | 6/2005 |
| WO | WO 2005/066431 A2 | 7/2005 |
| WO | WO 2004/067874 A2 | 9/2005 |
| WO | WO 2005/080096 A2 | 9/2005 |
| WO | WO 2005/097874 A2 | 10/2005 |
| WO | WO 2005/116337 A1 | 12/2005 |
| WO | WO 2005/116361 A1 | 12/2005 |
| WO | WO 2006/007413 A1 | 1/2006 |
| WO | WO 2006/013469 A1 | 2/2006 |
| WO | WO 2006/042651 A1 | 4/2006 |
| WO | WO 2006/043893 A1 | 4/2006 |
| WO | WO 2006/066776 A2 | 6/2006 |
| WO | WO 2006/126930 A1 | 11/2006 |
| WO | WO 2007/015669 A2 | 2/2007 |
| WO | WO 2007/015669 A3 | 2/2007 |
| WO | WO 2007/042258 A1 | 4/2007 |
| WO | WO 2007/059294 A2 | 5/2007 |
| WO | WO 2008/004960 A2 | 1/2008 |
| WO | WO 2008/004960 A3 | 1/2008 |
| WO | WO 2008/004960 A8 | 1/2008 |
| WO | WO 2008/148771 A1 | 12/2008 |
| WO | WO 2009/065768 A1 | 5/2009 |
| WO | WO 2009/065769 A2 | 5/2009 |

(56) References Cited

FOREIGN PATENT DOCUMENTS

| WO | WO 2009/065769 A3 | 5/2009 |
|---|---|---|
| WO | WO 2009/080772 A1 | 7/2009 |
| WO | WO 2009/080813 A1 | 7/2009 |
| WO | WO 2009/116926 A1 | 9/2009 |
| WO | WO 2009/124704 A1 | 10/2009 |
| WO | WO 2010/084466 A2 | 7/2010 |
| WO | WO 2010/087752 A1 | 8/2010 |
| WO | WO 2010/094500 A1 | 8/2010 |
| WO | WO 2011/087422 A1 | 7/2011 |
| WO | WO 2011/087423 A1 | 7/2011 |
| WO | WO 2011/129757 A1 | 10/2011 |
| WO | WO 2011/141851 A2 | 11/2011 |
| WO | WO 2012/004699 A2 | 1/2012 |
| WO | WO 201/141647 A1 | 10/2012 |

OTHER PUBLICATIONS

Pervan, Darko, et al., U.S. Appl. No. 15/704,634 entitled "Fibre Based Panels With a Wear Resistance Surface," filed in the U.S. Patent and Trademark Office on Sep. 14, 2017.

International Search Report issued in corresponding PCT/SE2012/050386, dated Jun. 27, 2012, 5 pages, ISA/SE Patent-och registreringsverket, Stockholm, SE.

BTLSR Toledo, Inc. website. http://www.btlresins.com/more.html. "Advantages to Using Powdered Resins," May 26, 2007, 2 pages, per the Internet Archive WayBackMachine.

Floor Daily, "Shaw Laminates: Green by Design," Aug. 13, 2007, 1 pg, Dalton, GA.

Nimz, H.H., "Wood," Ullmann's Encyclopedia of Industrial Chemistry, published online Jun. 15, 2000, pp. 453-505, vol. 39, Wiley-VCH Verlag GmbH & Co. KgaA, Weinheim, DE.

Parquet International, "Digital Printing is still an expensive process," Mar. 2008, cover p./pp. 78-79, www.parkettmagazin.com.

Engstrand, Ola (Contact)/Valinge Innovation, Technical Disclosure entitled "Fibre Based Panels With a Wear Resistance Surface," Nov. 17, 2008, IP.com No. IPCOM000176590D, IP.com PriorArtDatabase, 76 pages.

Engstrand, Ola (Contact)/Valinge Innovation, Technical Disclosure entitled "WFF Embossing," May 15, 2009, IP.com No. IPCOM000183105D, IP.com PriorArtDatabase, 36 pages.

Engstrand, Ola (Contact)/Valinge Innovation, Technical Disclosure entitled "VA063 VA064 Scattering and Powder Backing," Nov. 11, 2011, IP.com No. IPCOM000212422D, IP.com PriorArtDatabase, 34 pages.

Ayrilmis, Nadir, "Enhancement of dimensional stability and mechanical properties of light MDF by adding melamine resin impregnated paper waste," International Journal of Adhesion & Adhesives, 2012, pp. 45-49, vol. 33, ISSN 0143-7496, (article available online Nov. 10, 2011), Elsevier Ltd, NL.

Le Fur, X., et al., "Recycling melamine-impregnated paper waste as board adhesives," Holz als Roh-und Werkstoff, published online Oct. 26, 2004, pp. 419-423, vol. 62, Springer-Verlag, DE.

Odian, George, "Principles of Polymerization," 1991, 3rd Edition, 5 pages incl. pp. 122-123, John Wiley & Sons, Inc., New York, NY, USA.

Pervan, Darko, et al., U.S. Appl. No. 14/884,255, entitled "Method of Producing a Building Panel and a Building Panel," filed in the U.S. Patent and Trademark Office on Oct. 15, 2015.

\* cited by examiner

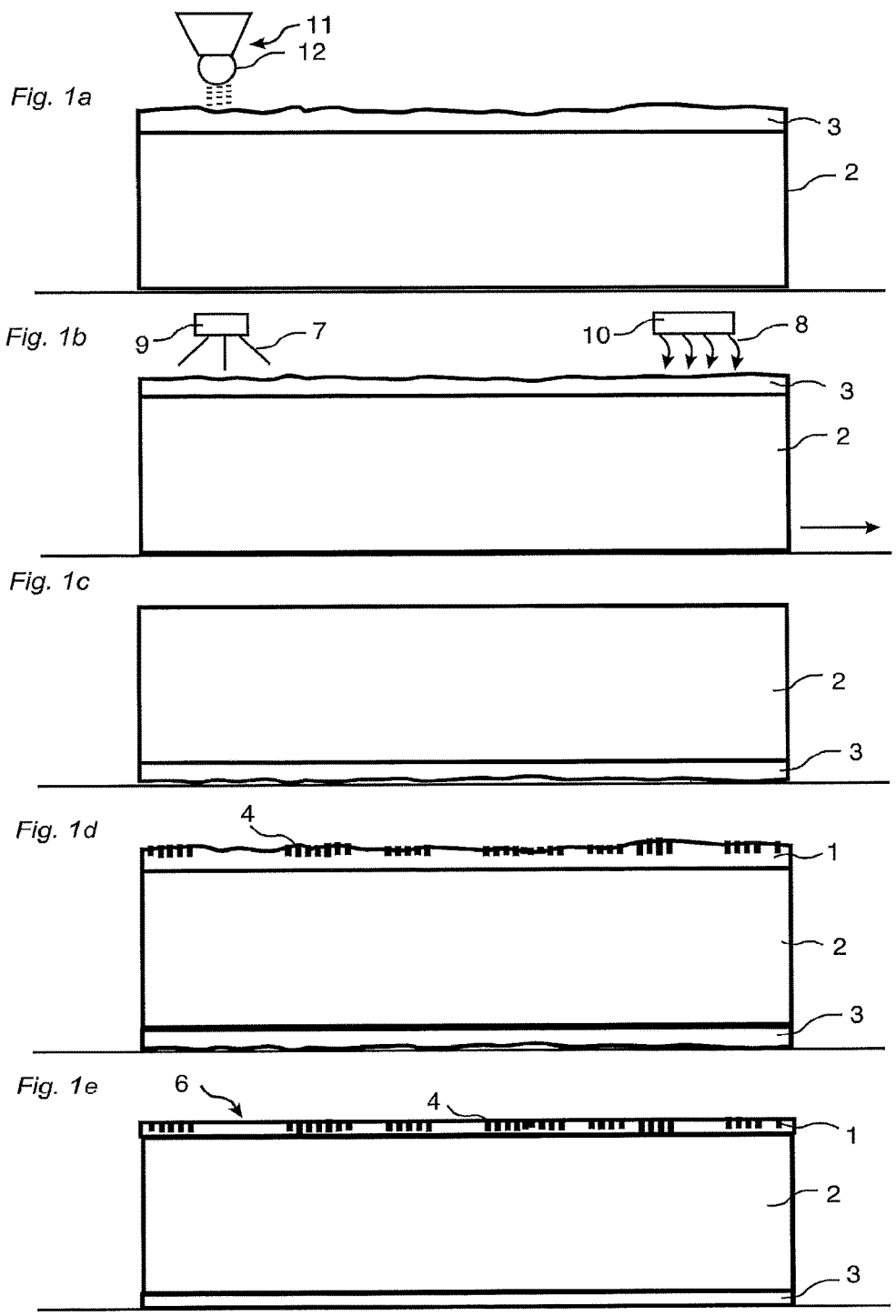

POWDER BASED BALANCING LAYER

CROSS REFERENCE TO RELATED APPLICATIONS

The present application is a continuation of U.S. application Ser. No. 13/444,653, filed on Apr. 11, 2012, which claims the benefit of Swedish Application No. 1150320-8, filed on Apr. 12, 2011, Swedish Application No. 1151058-3, filed on Nov. 9, 2011, U.S. Provisional Application No. 61/474,498, filed on Apr. 12, 2011, and U.S. Provisional Application No. 61/557,734, filed on Nov. 9, 2011. The entire contents of each of U.S. application Ser. No. 13/444, 653, Swedish Application No. 1150320-8, Swedish Application No. 1151058-3, U.S. Provisional Application No. 61/474,498, and U.S. Provisional Application No. 61/557, 734 are hereby incorporated herein by reference.

TECHNICAL FIELD

The disclosure generally relates to the field of panels with a decorative surface layer and a balancing and/or protective layer, preferably floor and wall panels. The disclosure relates to production methods to produce such panels.

FIELD OF APPLICATION

Embodiments of the present invention are particularly suitable for use in production of floating floors, which are formed of floor panels comprising a core and a decorative wear resistant solid surface layer comprising fibres, binders and wear resistant particles that have been applied on the core as a powder as described in WO 2009/065769. The field of application comprises products with other types of decorative layers such as paper based, laminated panels (DPL), where a balancing and/or a protecting layer is used. The following description of technique, problems of known systems and objects and features of the embodiments of the invention will therefore, as a non-restrictive example, be aimed above all at this field of application and in particular at floorings which are similar to traditional floating wood fibre based laminate floorings. The invention does not exclude floors that are glued down to a sub floor. Embodiments of the invention can also be used in building panels such as for example wall panels, ceilings, and furniture components and similar.

BACKGROUND

Wood fibre based direct pressed laminated flooring (DPL) usually comprises a core of a 6-12 mm fibre board, a 0.2 mm thick upper decorative surface layer of laminate and a 0.1-0.2 mm thick lower balancing and/or protective layer of laminate, plastic, paper or like material.

The surface layer of a laminate floor is characterized in that the decorative and wear properties are generally obtained with two separate layers one over the other. The decorative layer is generally a printed paper and the wear layer is a transparent overlay paper, which comprises small aluminium oxide particles.

The printed decorative paper and the overlay are impregnated with melamine formaldehyde resin and laminated to a wood fibre based core under heat and pressure. The balancing layer is used to keep the panel flat after production and when the panel is exposed to variations in moisture conditions that cause the surface layer to swell and shrink.

Recently new "paper free" Wood Fibre Floor (WFF) types have been developed with solid surfaces comprising a substantially homogenous mix of fibres, binders and wear resistant particles.

The wear resistant particles are preferably aluminium oxide particles, the binders are preferably thermosetting resins such as amino resins and the fibres are preferably wood based. Other suitable wear resistant materials are for example silica or silicon carbide. In most applications decorative particles such as for example colour pigments are included in the homogenous mix. In general all these materials are preferably applied in dry form as a mixed powder on a HDF core and cured under heat and pressure to a 0.1-1.0 mm solid layer.

Several advantages over known technology and especially over conventional laminate floorings can be obtained:
  The wear resistant surface layer, which is a homogenous mix, can be made much thicker and a wear resistance is achieved, which is considerably higher.
  New and very advanced decorative effects can be obtained with deep embossing and by separate decorative materials, which can be incorporated into the homogenous surface layer and coordinated with the embossing.
  An increased impact resistance can be reached with a homogenous surface layer, which is thicker and has a higher density.
  The homogenous surface layer can comprise particles that have a positive impact on sound and moisture properties.
  Production costs can be reduced since low cost and even recycled materials can be used and several production steps can be eliminated.

Powder technology is very suitable to produce solid decorative surface layer, which are much thicker than conventional laminate surface layers. Such solid powder based layers create a much higher tension on the panel when they shrink (or swell) during curing and balancing is a problem. It is therefore difficult to produce a panel with a thick and a high quality surface, which is also well balanced after pressing as well as stable and flat in variable moisture conditions.

Definition of Some Terms

By "surface layer" is meant all types of surface layers, which give the panel its decorative properties and its wear resistance. By a "WFF mix" is meant a mix of materials comprising fibres, binders, wear resistant particles and, optionally, a colour substance, which is preferably applied as powder on a carrier.

By "WFF floor" is meant a floor panel comprising a solid surface, which is obtained by a WFF mix that is preferably applied as dry powder on a core, such as for example HDF, and cured under heat and pressure.

Known Technique and Problems Thereof

The new "paper free" WFF floors with a solid surface comprising a WFF mix of fibres, preferably wood fibres, small, hard wear resistant particles and a binder are produced according to a production method where the WFF mix is applied in powder form on a core. The wood fibres are generally refined, mechanically worked, and of the same type as used in HDF and particleboard, i.e. treated in a way that the lignin content is essentially unchanged. They comprise natural resins such as lignin. The wear resistant particles are preferably aluminium oxide particles. The surface layer comprises preferably also colour pigments or other decorative materials or chemicals. Processed fibres e.g. bleached wood fibres may also be used. Processed fibres may be semi-transparent, and are preferably transparent in a cured binder.

A preferred binder is melamine or urea formaldehyde resin. Any other binder, preferably synthetic thermosetting or thermoplastic resins, may be used. The WFF layer is generally scattered in dry powder form on a wood based core, such as for example HDF.

The backside of the core is covered by a balancing layer, which comprises one or several papers impregnated with melamine resin in order to get a balanced product after pressing. The panel is generally produced with a surface that is slightly convex in order to be able to stay flat even in very dry conditions.

The total build up with decorative layer, core and balancing or protective layer is transferred into a press, where the decorative layer and the balancing or protective layer are cured, under the influence of heat and pressure.

By a protective layer is meant a layer adapted to protect the backside of the core.

The curing of a melamine formaldehyde (MF) resin involves shrinkage of the MF resin matrix and the balancing layer is needed to balance the shrinkage forces from the decorative layer.

Paper based backer materials can create problems as the paper always has a dominating fibre direction either in the production direction or perpendicular to the production direction. The shrinkage during curing is always higher in the transverse direction of the fibres as the fibres can be packed together closer in this direction. The implication of this behavior is that the balancing layer has different shrinkage in the production direction compared with the transverse direction.

As the backer is used to balance the decorative layer, which may as an example comprise a powder mix with random fibre direction, the consequence is that an optimized balancing only can be obtained in one direction, either along or perpendicular to the production direction. It is also complicated to adapt the thickness of the paper to different thicknesses of the surface layer.

However, the paper based balancing layer offer the advantages that the paper is rather easy to transport together with the core under the scattering units and into a press.

It is known from WO 2009/065769 that the balancing layer can be created with a powder layer that is applied on the backside of the core. This known disclosure does not show how a powder layer on a back side of a core should be handled in order to allow a cost efficient production, especially when discontinuous presses are used which require that the core with its powder based layers can be fed in high speed with clamping devices into a press.

The above description of various known aspects is the applicants' characterization of such, and is not an admission that any of the description is prior art.

OBJECTS AND SUMMARY

An objective of certain embodiments of the invention is to provide a building panel, preferably a floor panel with a decorative surface layer and a balancing and/or protective layer which can be produced in a cost efficient way.

A first aspect of the invention is a method of manufacturing a building panel with a decorative surface layer, a core and a balancing and/or protective layer. The method comprises the steps below and preferably performed in the listed sequence:

applying a first layer of a first powder based mix, comprising wood fibres and a thermosetting binder on a core;

applying a liquid substance on the first powder based mix;

drying the first powder based mix;

turning the core with the dried first powder based mix such that the first powder based mix points downwards;

applying a second layer on the upper part of the core; and curing the first and second layers simultaneously by providing heat and pressure, wherein the first layer forms the balancing and/or protective layer and the second layer forms the decorative surface layer in the building panel.

The method offers the advantages that a powder based balancing or protective layer can be applied in a cost efficient way by scattering on a core. The powder may be fixed to the core with a liquid substance that swells, partly dissolves or dissolves the resin, thereby making the powder tacky and stick together. A drying step removes part of the water thus leaving the powder glued not only to itself but also to the core. The attachment makes the first layer stable such that the core with the first layer can be turned and fed under scattering units and into a press. A paper based balancing or protective layer can be replaced in a cost efficient way by a wood fibre based layer with random fibre direction that has similar shrinkage properties as the decorative surface layer.

The building panel may be a floor panel.

The core may be a HDF or MDF board.

The second layer may comprise a veneer layer. Thereby, the veneer layer forms the decorative surface layer. The second layer may comprise a sheet-shaped layer of wood. A curable lacquer may be applied on top of the veneer layer.

The second layer may comprise a first paper sheet. In this embodiment, the second layer forming the decorative surface layer is a laminate such as a DPL (direct pressed laminate) or HPL (high pressure laminate).

The second layer may further comprise a second paper sheet.

The first and/or the second paper sheet may be impregnated with a thermosetting resin such as melamine formaldehyde.

The first paper sheet may be arranged such that the fibre direction of the first paper sheet is extending in a first direction, and the second paper sheet may be arranged such that the fibre direction of the second paper sheet is extending in a second direction, said second direction being transverse to the first direction.

The second layer may comprise a second powder based mix comprising wood fibres, binders, preferably a thermosetting binder, and wear resistant particles. Thereby, the second layer can be applied in the same way as the powder based balance or protective layer by scattering on the core.

The method may comprise the further step of applying a print or a colour substance into the second mix.

A second aspect of the invention is a method of manufacturing a building panel with a decorative surface layer, a core and a balancing and/or protective layer. The method comprises the steps below and is preferably performed in the listed sequence:

applying a first layer of a first powder based mix, comprising wood fibres and a thermosetting binder on a carrier, preferably of a thin material with a thickness that does not exceed the thickness of the decorative surface layer;

placing the core material on the first powder based mix;

applying a second layer on the upper part of the core; and curing the first and second layers by providing heat and pressure wherein the first layer forms the balancing and/or protective layer and the second layer forms the decorative surface layer of the building panel.

The method offers the advantages that a powder based balancing or protective layer can be applied in a cost efficient way by scattering on a carrier that keeps the powder based balancing or protective layer connected to the core during transport to the device that applies the surface layer and finally when the core is fed into the press.

The building panel may be a floor panel.

The core may be a HDF or MDF board.

The carrier may be a fibre based material.

The second layer may comprise a veneer layer. Thereby, the veneer layer forms the decorative surface layer. A curable lacquer or powder mix layer may be applied on top of the veneer layer.

The second layer may comprise a first paper sheet. In this embodiment, the second layer forming the decorative layer is a laminate such as a DPL (direct pressed laminate) or HPL (high pressure laminate).

The second layer may further comprise a second paper sheet.

The first and/or the second paper sheet may be impregnated with a thermosetting resin such as melamine formaldehyde.

The first paper sheet may be arranged such that the fibre direction of the first paper sheet is extending in a first direction, and the second paper sheet may be arranged such that the fibre direction of the second paper sheet is extending in a second direction, said second direction being transverse to the first direction.

The second layer may comprise a second powder based mix comprising wood fibres, binders, preferably a thermosetting binder, and wear resistant particles. Thereby, the second layer can be applied in the same way as the powder based balance or protective layer by scattering on a core.

The method may comprise the further step of applying a print or a colour substance into the second mix.

A third aspect of the invention is a method of manufacturing a separate and continuous powder based balancing and/or protective layer, which is essentially uncured. The method comprises the steps below and is preferably performed in the listed sequence:

applying a powder mix comprising fibres and a thermosetting binder on a carrier;

applying moisture on the powder mix such that the powder mix is connected together to an essential uncured balancing and/or protective layer; and releasing the uncured balancing and/or protective layer from the carrier.

The separate and continuous powder based balancing or protective layer may be used in a method for producing a building panel which method comprises the steps below and is preferably performed in the listed sequence:

placing the uncured balancing and/or protective layer under a core material;

applying a surface layer on the core material; and curing the surface layer and the uncured balancing and/or protective layer under heat and pressure.

The method offers the advantages that a powder based balancing or protective layer can be produced as a separate uncured layer that can be handled as a conventional paper based balancing or protective layer. The moisture, that preferably comprises water, may be sprayed on the powder such that the binder, preferably a melamine resin, moisture swells, partly dissolves or dissolve the resin, thereby making the powder tacky and stick together. The fibres in the mix will be connected to each other when the water dries. The fibres may also be connected by applying heat, e.g., IR heating, thereby removing the moisture and connecting the fibres in the mix. A powder based uncured balancing or protective layer may be formed as a flexible thin sheet and a core material may be placed over the balancing or protective layer.

The surface layer may comprise a powder based surface layer, at least one paper sheet or a veneer layer.

A fourth aspect of the invention is a separate and continuous powder based balancing and/or protective layer, which is essentially uncured. The separate layer comprises powder mix comprising connected fibres and an essentially uncured thermosetting binder.

The powder based balancing or protective layer is preferably produced according to the method of the third aspect.

A fifth aspect of the invention is a building panel, comprising a core, preferably a wood-based core such as MDF or HDF board, a decorative surface layer arranged on a first surface of said core, the decorative surface layer comprising at least one paper layer, and a balancing layer arranged on a second surface of said core, said second surface being opposite to said first surface, wherein the balancing layer is formed of a powder based mix comprising wood fibres and a thermosetting binder.

The building panel is preferably produced according to the first or second aspect of the invention.

BRIEF DESCRIPTION OF THE DRAWINGS

The invention will in the following be described in connection to preferred embodiments and in greater detail with reference to the appended exemplary drawings, wherein, FIGS. 1a-e illustrate a method to form a balancing and/or protective layer.

DETAILED DESCRIPTION OF EMBODIMENTS

Figure 2A:
FIGS. 2a-e illustrate a method to form a balancing and/or protective layer.

The powder intended to be used as a balancing and/or protective layer 3 is applied as a first powder mix on a core 2, preferably a MDF or HDF material, preferably by one or several scattering units 11 as shown in FIG. 1a. FIG. 1b shows that the powder is thereafter pre-stabilized by a fluid 7, preferable based on water, which is applied by a stabilizing device 9. The first powder layer is thereafter dried. Such drying can be performed off-line in a controlled environment or in-line by applying heat 8 with a heating device 10 on the powder mix 3. The heating device 10 may comprise infrared light. The water based fluid 7 and the following drying 8, attaches the powder layer 3 to the core 2, to such an extent that the core 2 with the powder can be turned 180° to bring the powder based balancing or protective layer 3 downwards, as shown in FIG. 1c, such that it may be transported further along the production line or be stacked on a pallet for intermediate storage before further production takes place.

Oversized or undersized fibres from the hammer mill that produces the fibres for the surface layer may be used in the balancing or protective layer mix. The fibre size is not as critical as in a powder based surface layer and may vary from a fibre length of several mm to less than 0.1 mm. The most preferred average fibre length is 0.1-1.0 mm.

A second powder based surface layer mix 1 is thereafter applied on the upper side of the core 2 as showed in FIG. 1d. A digital print 4 may be printed into the surface layer 1. The surface layer 1 preferably also comprises wood fibres, a colour substance, thermosetting binders and aluminium oxide particles.

The wood fibres in both the first and second powder mixes in all embodiments of the invention may be virgin, unrefined, refined and/or processed, comprising lignin and without lignin, e.g. α-cellulose fibres or holocellulose. A mixture of refined and unrefined fibres may also be used. It is also contemplated that vegetable fibres as jute, linen, flax, cotton, hemp, bamboo, bagasse and sisal may be used. Also mineral fibres and carbon fibres may be used.

Figure 3:
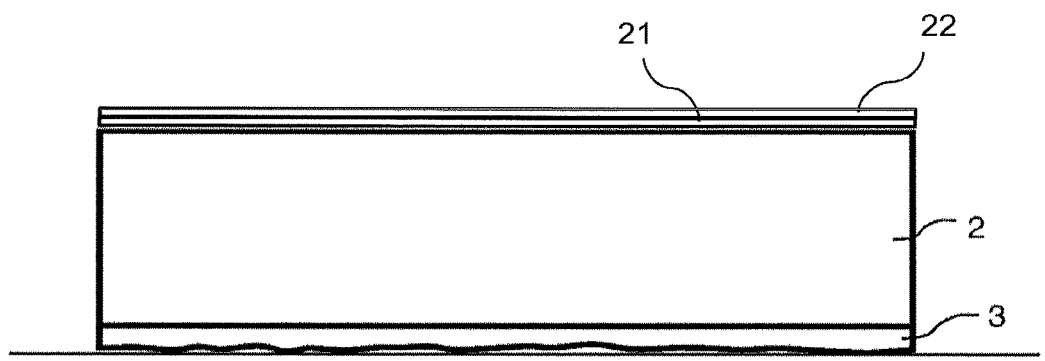
FIG. 3 illustrates a building panel wherein the decorative layer is laminate.

As an alternative to the second powder based surface layer mix, the second layer forming the decorative surface layer may comprise at least one paper sheet 21 adapted to form a laminate, which is shown in FIG. 3. Said at least one paper sheet 21 may be arranged on the upper side of the core. Preferably, the second layer comprises a first paper sheet 21 and a second paper sheet 22. The first and second paper sheets 21, 22 may be arranged such that the fibre direction of the first paper sheet 21 is extending in a first direction, and the fibre direction of the second paper sheet 22 is extending in a second direction being opposite to the first direction. By arranging the fibre direction of the sheets transversely, the second layer has fibre directions in more than one direction. Thereby, during shrinkage, the second layer obtains properties more similar to the balancing or protective layer having a random fibre direction compared to a surface layer having only one dominating fibre direction.

The first paper sheet 21 may be a printed paper. The second paper sheet 22 may be a transparent overlay paper. The second paper sheet 22 may form a wear layer and may comprise small aluminium oxide particles. The first and second paper sheets 21, 22 may be impregnated with melamine resin such that they can be laminated to the core under heat and pressure simultaneously as curing the balancing and/or protective layer. The second paper sheet 22 may be arranged on top of the first paper sheet 21.

Figure 4:
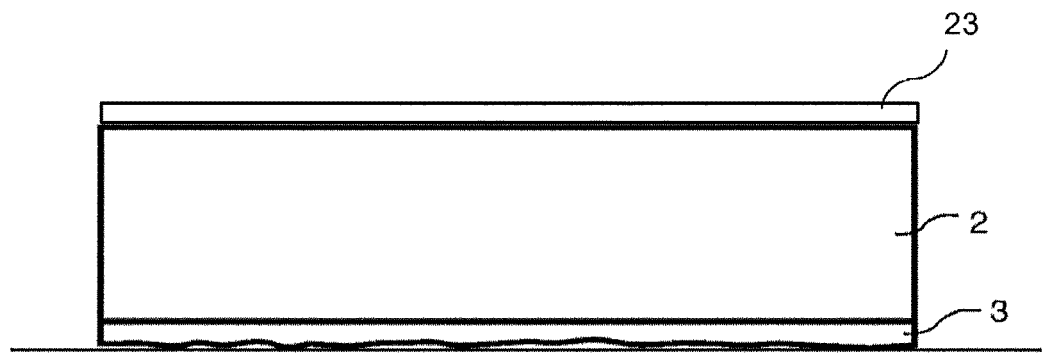
FIG. 4 illustrates a building panel wherein the decorative layer is a veneer layer.

Alternatively, the second layer may comprise a veneer layer 23 or sheet-shaped layer of wood arranged on the upper side of the core, which is shown in FIG. 4. The second layer may further comprise a curable lacquer layer applied on top of the veneer layer or sheet-shaped layer of wood. The curable lacquer layer may be cured simultaneously as curing the balancing and/or protective layer.

Other décor layers may also be used as a second layer, such as cork, rubber, plastics, especially a thermoplastic décor layer.

The core 2 with the surface layer 1 and the balancing or protective layer 3 is thereafter fed into a press where the layers are cured under heat and pressure. The balancing layer may be optimized in thickness and material composition in order to create a perfect balancing of the surface layer. The fibre orientation in the layers may be essentially the same.

Recycled fibres from the machining of the panels, for example when a mechanical locking system is formed, may be used in the balancing or protective layer mix.

The balancing or protective layer 3 may preferably comprise a homogenous powder mixture comprising about 50 weight % recycled MDF fibres with a moisture content of preferably 3-8% and about 50 weight % Melamine Formaldehyde (MF) resin (Prefere 4865, Dynea). The MF resin amount can vary between 30-70 w-%, preferably 40-65 w-% and most preferably 45-60 w-%. The fibre content may vary from 30-70%, most preferably between 40-55%.

If needed the powder formulation can be modified such that thermosetting particles, pigments, hard particles, release agents, wetting agents and similar materials are included into the mix. The thermosetting plastic particles may be mixed at random into the powder or applied as a separate thin layer and may be used to provide a sealing against moisture penetration into the core.

The core of an HDF board preferably has a moisture content of 0-8%.

The scattering unit 11 may have capacity of scattering of 100-1000 $g/m^2$ with a tolerance of +/−5% as measured using a calibration cup with an area of 100×100 mm cross- and length wise the board. The amount of stabilization fluid may vary from 0 up to 200 $g/m^2$.

The scattering unit 11 may comprise a needle belt and a scattering roller 12. The scattering roller is provided with needles in the range of about 30-120, preferably about 50-100, and most preferably about 70-90 needles per $cm^2$. The needle length is about 0.5-2.5 mm, preferably about 1-2 mm and most preferably about 1.5 mm. Several scattering units 11 may be used to even out differences in the applied powder mixture.

Furthermore, the scattering unit may be provided with a needle belt with needles with a preferred length of about 15-20 mm, a preferred frequency in the range of about 500-1000 rpm preferably about 1000 rpm, and a stroke length of about +/−3 mm.

The stabilizing device 9 and the heating device 10 may be used to stabilize the surface layer 1 and/or the balancing or protective layer 3.

The stabilization device 9 may stabilize the powder using steam, nozzle spray coating or ultra-sonic spray coating.

Stabilization fluid may comprise solvents such as non-polar solvents, polar aprotic solvents and polar protic solvents or mixtures thereof. Preferred solvents are polar protic solvents such as isopropanol, ethanol and water. Most preferred is water.

The stabilization fluid can further comprise additives such as wetting agents, defoamers, release agents, anti-slip agents and catalysts.

Figure 2B:
Figure 2C:
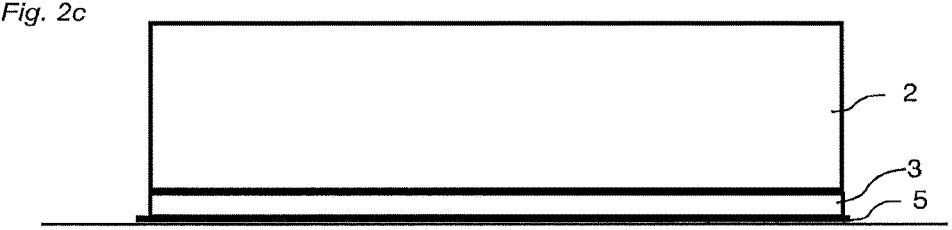
Figure 2D:
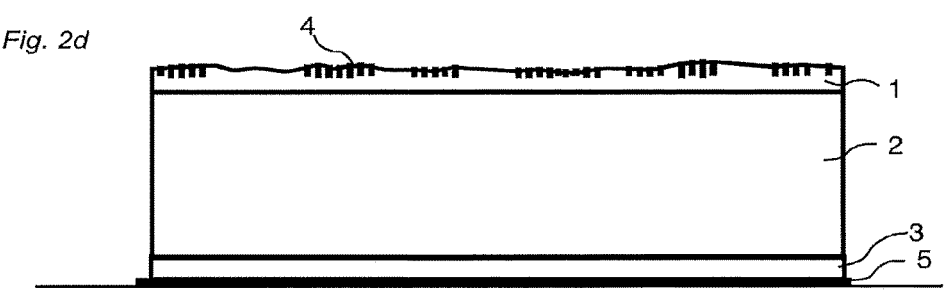
Figure 2E:
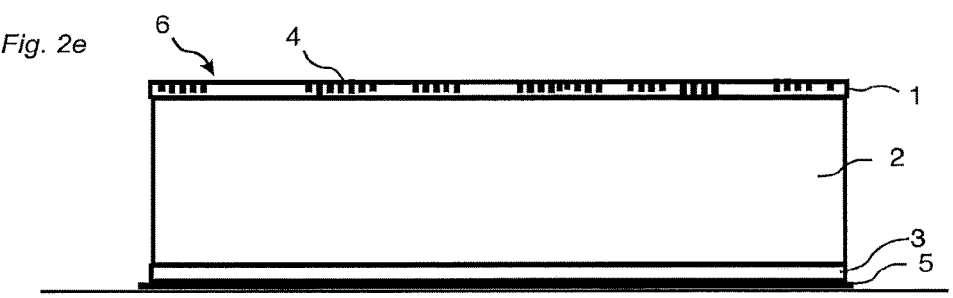

FIGS. 2a-2e show how a powder based balancing or protective layer can be applied by applying the powder based balancing or protective layer as a first mix 3 on a carrier 5. The core is applied on the mix (FIG. 2c) and a powder based surface layer 1 is applied on the core 2. Alternatively, a surface layer of at least one paper sheet 21 or veneer layer 23 is applied to the core for forming a decorative surface layer, as described above with reference to FIGS. 3 and 4. Stabilizing and/or heating of the balancing and/or surface layers may be made as described above. The core and layers are fed into a press and cured under heat and pressure to a building panel as shown in FIG. 2e.

The carrier may be a paper with a weight of for example 100-200 gr. It may also be a non-woven fibre based material or a foil.

Powder may also be applied on a carrier that preferably is a conveyor belt 11 and stabilized with fluid and dried such that it can be released from the conveyor 11 and handled as a separate sheet without the carrier 5 as shown in FIG. 2*b*. Such a separate and continuous sheet or layer is essentially uncured. The sheet or layer may be flexible such that it may be bent. The powder may comprise fibres, preferably wood fibres, and a thermosetting binder.

EXAMPLES

In example 1 below the powder formulation for the balancing layer used comprising 50 weight-% recycled MDF fibre (Välinge Innovation Sweden), 50 weight-% Melamine Formaldehyde resin (Prefere 4865, Dynea).

Example 1: Powder Based Product Obtained Through Heat Compression of Product Produced with Powder Based Balancing Layer and a Treated Powder as Decorative Layer A balancing layer was formed by scattering 500 g/m$^2$ of powder on a 9.7 mm HDF core. 40 g/m$^2$ of stabilization fluid with 5 w-% wetting agent, 6 w-% release agent and 3 w-% catalyst was applied by spraying on the powder based balancing layer mix The powder and the stabilization fluid were applied at a line speed of 2.7 m/min. The powder based balancing layer was dried at the same line speed with IR with an effect of 19 kW.

The resulting intermediate product with a stabilized powder based balancing layer was turned 180° and stacked on a pallet before use in the next operation where a decorative surface layer of 500 gr/m$^2$ was applied in powder form on the core.

The core with the surface and balancing layers was pressed in a press with a pressure of 40 kg/cm$^2$, during 25 seconds. The upper press table applied a heat of 170 degrees C. on the surface layer and the lower press table applied a heat of 175 degrees C. on balancing layer.

A panel with a small pre tension backwards and a slightly convex surface was obtained.

In example 2 below the powder formulation for the balancing layer used comprising 42 weight-% recycled MDF fibre (Välinge Innovation Sweden), 58 weight-% Melamine Formaldehyde resin (Prefere 4865, Dynea).

Example 2: Powder Based Product Obtained Through Heat Compression of Product Produced with Powder Based Balancing Layer and a Treated Powder as Decorative Layer A balancing layer was formed by scattering 320 g/m$^2$ of powder on a 9.7 mm HDF core.

40 g/m$^2$ of stabilization fluid with 1 wt-% wetting agent, 6 wt-% rerelease agent and 1 wt-% catalyst was applied by spraying on the powder based balancing layer mix The powder and the stabilization fluid were applied at a line speed of 2.0 m/min. The powder based balancing layer was dried at the same line speed with IR with an effect of 19 kW.

The resulting intermediate product with a stabilized powder based balancing layer was turned 180° and feed into the next operation where a decorative surface layer of 550 gr/m$^2$ was applied in powder form on the core.

The core with the surface and balancing layers was pressed in a press with a pressure of 40 kg/cm$^2$, during 37 seconds. The upper press table applied a heat of 184° C. on the surface layer and the lower press table applied a heat of 175° C. on balancing layer.

A panel with a small pre tension backwards and a slightly convex surface was obtained.

It is contemplated that there are numerous modifications of the embodiments described herein, which are still within the scope of the invention as defined by the appended claims.

For example, it is contemplated that the balancing layer may be provided with an orientation in some embodiments. The wood fibres based the balancing layer generally has a random fibre direction. However, in order to form a balancing layer having similar properties as the decorative surface layer, an orientation may be formed in the balancing layer. Such orientation may be provided with by means of scattering the powder in a specific pattern, by a pattern in the press plate, or by means of a rake forming a pattern.

The steps of the method claims do not necessarily have to be performed in the above described order. It is for example contemplated that the second layer may be applied before the first layer, and that the core is turned after the second layer has been applied. Thereafter the first layer is applied, liquid is applied, the first powder based mix is dried and the core is turned with the dried first powder based mix such that the first powder based mix points downwards.

The invention claimed is:

1. A method of manufacturing a building panel with a decorative surface layer, a core and a balancing and/or protective layer, wherein the method comprises the steps:
    applying a first layer of a first powder based mix, comprising wood fibres and a thermosetting binder, on a core;
    applying a liquid substance on the first powder based mix;
    drying the first powder based mix;
    turning the core with the dried first powder based mix such that the first powder based mix points downwards and an upper part of the core faces upwards;
    applying a second layer on the upper part of the core; and
    curing the first and second layers by providing heat and pressure, wherein the first layer forms the balancing and/or protective layer and the second layer forms the decorative surface layer in the building panel.

2. The method as claimed in claim 1, wherein the building panel is a floor panel.

3. The method as claimed in claim 1, wherein the core is a HDF or MDF board.

4. The method as claimed in claim 1, wherein the step of applying said second layer comprises applying a veneer layer.

5. The method as claimed in claim 1, wherein the step of applying said second layer comprises applying a first paper sheet.

6. The method as claimed in claim 5, wherein the step of applying said second layer further comprising applying a second paper sheet.

7. The method as claimed in claim 6, wherein the step of applying said first and second paper sheets comprises arranging said first paper sheet such that the fibre direction of the first paper sheet is extending in a first direction, and arranging said second paper sheet such that the fibre direction of the second paper sheet is extending in a second direction, said second direction being transverse to the first direction.

8. The method as claimed in claim 1, wherein the step of applying the second layer comprises applying a second powder based mix comprising wood fibres, binders, and wear resistant particles.

9. The method as claimed in claim 8, wherein the method comprises the further step of applying a print or a colour substance into the second mix.

10. A method of manufacturing a building panel with a decorative surface layer, a core and a balancing and/or protective layer, wherein the method comprises the steps of:
   applying a first layer of a first powder based mix, comprising wood fibres and a thermosetting binder, on a carrier;
   applying a liquid substance on the first powder based mix;
   placing a lower surface of the core on the first powder based mix after the liquid substance has been applied on the first powder based mix;
   applying a second layer on an upper surface of the core; and
   curing the first and second layers by providing heat and pressure, wherein the first layer forms the balancing and/or protective layer and the second layer forms the decorative surface layer of the building panel.

11. The method as claimed in claim 10, wherein the building panel is a floor panel.

12. The method as claimed in claim 10, wherein the core is a HDF or MDF board.

13. The method as claimed in claim 10, wherein the carrier is a fibre based material.

14. The method as claimed in claim 10, wherein the step of applying said second layer comprises applying a veneer layer.

15. The method as claimed in claim 10, wherein the step of applying said second layer comprises applying a first paper sheet.

16. The method as claimed in claim 15, wherein the step of applying said second layer further comprising applying a second paper sheet.

17. The method as claimed in claim 16, wherein the step of applying said first and second paper sheet comprises arranging said first paper sheet such that the fibre direction of the first paper sheet is extending in a first direction, and arranging said second paper sheet such that the fibre direction of the second paper sheet is extending in a second direction, said second direction being transverse to the first direction.

18. The method as claimed in claim 10, wherein the step of applying said second layer comprises applying a second powder based mix comprising wood fibres, binders, and wear resistant particles.

19. A method of manufacturing a separate and continuous powder based balancing and/or protective layer, which is essentially uncured, wherein the method comprises the steps of:
   applying a powder mix, comprising fibres and a thermosetting binder, on a carrier;
   applying moisture on the powder mix such that the powder mix is connected together to form an uncured balancing and/or protective layer; and
   releasing the uncured balancing and/or protective layer from the carrier.

20. The method as claimed in claim 19, wherein the fibres are wood fibres and the binder a melamine resin.

21. The method as claimed in claim 10, wherein the carrier is of a thin material with a thickness that does not exceed the thickness of the decorative surface layer.

22. The method as claimed in claim 1, wherein the step of applying the first layer of the first powder based mix is done by scattering.

23. The method as claimed in claim 1, wherein the step of drying the first powder based mix comprises applying heat, the heat being applied before the step of turning the core.

24. The method as claimed in claim 1, wherein the wood fibres of the first powder mixture possesses a moisture content of between 3-8 weight-%.

25. The method as claimed in claim 1, wherein a stabilization device applies the liquid substance on the first powder based mix.

26. The method as claimed in claim 25, wherein the stabilization device uses at least one of steam, nozzle spray coating, and ultrasonic coating to apply the liquid substance on the first powder mixture.

27. The method as claimed in claim 1, wherein the liquid substance further comprises an additive, the additive comprising at least one of a wetting agent, a release agent, a defoamer, an anti-slip agent, and a catalyst.

28. A method of manufacturing a building panel comprising the steps, performed in order, of:
   applying a first layer of a first powder based mix comprising wood fibres and a thermosetting binder on a first surface of a core, the core possessing a second surface positioned opposite the first surface of the core;
   applying a liquid substance on the first powder based mix;
   drying the first powder based mix;
   turning the core with the dried first powder based mix such that the first surface with the first powder based mix points downwards and the second surface of the core faces upwards;
   applying a second layer on the second surface of the core; and
   curing the first and second layers by providing heat and pressure to form the building panel, wherein the first layer forms a balancing and/or protective layer connected to the first surface of the core and the second layer forms a decorative surface layer connected to the second surface of the core.

* * * * *